US006823312B2

(12) United States Patent
Mittal et al.

(10) Patent No.: US 6,823,312 B2
(45) Date of Patent: Nov. 23, 2004

(54) PERSONALIZED SYSTEM FOR PROVIDING IMPROVED UNDERSTANDABILITY OF RECEIVED SPEECH

(75) Inventors: Parul A. Mittal, New Delhi (IN); Pradeep Kumar Dubey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/764,575

(22) Filed: Jan. 18, 2001

(65) Prior Publication Data

US 2002/0095292 A1 Jul. 18, 2002

(51) Int. Cl.[7] .................................................. G10L 15/00
(52) U.S. Cl. ........................................ 704/271; 704/257
(58) Field of Search ................................. 704/271, 257, 704/270; 381/314, 315; 379/52

(56) References Cited

U.S. PATENT DOCUMENTS 4,507,750 A * 3/1985 Frantz et al. ............... 704/277
5,434,924 A * 7/1995 Jampolsky ................. 381/68.4
5,553,151 A * 9/1996 Goldberg .................. 381/68.4
5,839,109 A 11/1998 Iwamida
6,036,496 A * 3/2000 Miller et al. ................ 434/156
6,071,123 A * 6/2000 Tallal et al. ................ 434/116
6,109,107 A 8/2000 Wright et al.
6,349,598 B1 * 2/2002 Wright et al. ................. 73/585
6,358,056 B1 * 3/2002 Jenkins et al. .............. 434/185
6,408,273 B1 * 6/2002 Quagliaro et al. .......... 704/271
6,511,324 B1 * 1/2003 Wasowicz .................. 434/167

* cited by examiner

*Primary Examiner*—Daniel Abebe
(74) *Attorney, Agent, or Firm*—McGinn & Gibb, PLLC; T. Rao Coca, Esq.

(57) ABSTRACT

The present invention provides a method and system for providing improved understandability of received speech characterized in that it includes input interface adapted to capture received speech signals connected to a speech recognition means for identifying the contents of the received speech connected to one input of a data processor adapted to perform improvement in understandability, a user profile storage connected to another input of said data processor for providing user specific improvement data, and an output generator connected to the output of said data processor to produce personalized output based on an individual's needs. The instant invention also provides a configured computer program product for carrying out the above method.

85 Claims, 6 Drawing Sheets

PERSONALIZED SYSTEM FOR PROVIDING IMPROVED UNDERSTANDABILITY OF RECEIVED SPEECH

FIELD OF THE INVENTION

The present invention relates to a personalized system for providing a service for improving understandability of received speech in accordance with user specific needs. The said system is online and used by a plurality of users, addressing the user's inability to understand speech.

BACKGROUND OF THE INVENTION

The existing solutions are all in the form of an equipment or device that can be used only by one person. The problem with such individual-use devices is that it is not feasible and practical for each such individual device to stay continuously upgraded with the latest advancements in technology or to dynamically customize with the changes in the user's acoustic profile, usage environment and conversation context. There are multiple reasons for this. It is also not always possible to customize an off-the-shelf equipment for an individual's disability and needs. Also the latest technological advancements and algorithms are likely to be expensive for incorporation in an individual device, thereby limiting its quality of service. A device like this is usually required to be used for a long period of time, in some cases for the lifetime of the individual. It is not easy for a device to adjust and customize dynamically to the changes in an individuals disability over a period of time, without requiring a repurchase. It is also not possible to make use of the specific conversation context or environment to achieve better results. E.g. the user could be using the device in a plurality of business contexts, in social setting or at home during the day. It is not easy to customize an individuals device at such fine granularity level.

Some systems have been proposed that address other aspects of speech understanding. For example U.S. Pat. No. 6,036,496 describes an apparatus and method for screening an individual's ability to process acoustic events. The invention provides sequences (or trials) of acoustically processed target and distracter phoneme to a subject for identification. The acoustic processing includes amplitude emphasis of selected frequency envelopes, stretching (in the time domain) of selected portions of phoneme, and phase adjustment of selection portions of phoneme relative to a base frequency. After a number of trials, the invention develops a profile for an individual that indicates whether the individual's ability to process acoustic events is within a normal range, and if not, what processing can provide the individual with optimal hearing. The invention provides a method to determine an individual's acoustic profile. This is better than the typical hearing tests, which determine whether an individual can hear particular frequencies, at particular amplitudes. The invention also mentions that the individual's profile can then be used by a listening or processing device to particularly emphasize, stretch, or otherwise manipulate an audio stream to provide the individual with an optimal chance of distinguishing between similar acoustic events.

Another U.S. Pat. No. 6,071,123 proposes a method and a system that provides means to enable individuals with speech, language and reading based communication disabilities, due to a temporal processing problem, to improve their temporal processing abilities as well as their communication abilities. The method and system include provisions to elongate portions of phoneme that have brief and/or rapidly changing acoustic spectra, such as occur in the stop consonants b and d in the phonemes /ba/ and /da/, as well as reduce the duration of the steady state portion of the syllable. In addition, some emphasis is added to the rapidly changing segments of these phonemes. Additionally, the disclosure includes method for and computer software to modify fluent speech to make the modified speech better recognizable by communicatively impaired individuals. The proposed apparatus is a device or an equipment to be used by an individual.

U.S. Pat. No. 6,109,107 provides an improved method and apparatus for the identification and treatment of language perception problems in specific language impaired (SLI) individuals. The invention provides a method and apparatus for screening individuals for SLI and training individuals who suffer from SLI to re-mediate the effects of the impairment by using the spectral content of interfering sound stimuli and the temporal ordering or direction of the interference between the stimuli. This emphasis in this invention is on screening and training individuals and not providing a device or a service to address the disability.

U.S. Pat. No. 5,839,109 also describes a speech recognition apparatus that includes a sound pickup, a standard feature storage device, a comparing device, a display pattern storing device, and a display. The apparatus can display non-speech sounds either as a message or as an image, and is especially useful for hearing-impaired individuals. For example, if a fire engine siren is detected, the display can show a picture of a fire engine, or can display the message "siren is sounding".

All of the above solutions are limited to addressing hearing disabilities and are not directed at improving the understandability of speech which is an issue that could occur even with individuals without hearing disabilities. For example aspects relating to spoken accent or as an extreme case, a different language are not addressed by any of the above solutions.

In addition, even for cases where physical disability is involved, none of the above solutions addresses those situations where extreme disabilities occur—for Example, complete loss of hearing or complete loss of hearing coupled with blindness.

The existing solutions are also non-adaptive as they do not automatically adjust to dynamically varying individual requirements-eg. Ambient noise levels, change in hearing patterns etc., nor are they capable of automatically adapting to different user profiles, as a result it is not feasible for multiple users to use the same system.

DETAILED DESCRIPTION

The object of this invention is to obviate the above drawbacks and to provide personalized improved understandability of speech based on an individual's needs.

The second object of this invention is to display the speech in text or as graphics on a display panel on the phone device instead of being an audio heard through the phone speaker.

Another object of this invention is to provide data processing functionality as a third party service to a plurality of users, over a network, such as an Intranet, an Extranet or an Internet.

Yet another object of this invention is to provide a self learning system using artificial intelligence and expert system techniques.

Another object of this invention is to provide a speech-enabled WAP (Wireless Application Protocol) system for hearing or speech.

To achieve the said objective this invention provides a personalized system for providing a service for improving understandability of received speech in accordance with user specific needs characterized in that it includes:

input interface means for capturing received speech signals connected to a speech recognition or speech signal analysis means for identifying the contents of the received speech connected to one input of a data processing means for performing improvement in understandability, a user profile storage means connected to another input of said data processing means for providing user specific improvement data, and an output generation means connected to the output of said data processing means to produce personalized output based on an individual's needs.

The said personalized system is online.

The said speech recognition means is any known speech recognition means.

The said data processing means is a computing system.

The said data processing means is a server system in a client server environment.

The said data processing means is a self-learning system using artificial intelligence or expert system techniques, which improves its performance based on feedback from the users over a period of time and also dynamically updates the users current profiles.

The said speech recognition means, speech signal analysis means, data processing means and output generation means individually or collectively improve performance automatically with time, use, improvement in technology, enhancement in design or changes in user profile and provides the improved service without the need to make any changes to the user equipment.

The said output generation means is a means for generating speech from the electrical signal received from said data processing means.

The said output generation means is a display means for generating visual output for the user.

The said output generation means is a vibro-tactile device for generating output for the user in tactile form.

The above system further includes means for the user to register with said system.

The said data processing means includes means to perform the understandability improvement with reference to the context of the received speech.

The said data processing means includes means to translate the received speech from one language to another.

The said data processing means includes means for computing the data partially on the client and partially on the server.

The said data processing means includes the means for the user to specify or modify the stored individual profile.

The user identifies himself by a userid at the beginning of each transaction.

The said data processing means includes a default profile means in the absence of specific user profiles.

The system allows the user to specify a usage environment or conversation context at the beginning of each transaction.

The data processing means includes use of a specified context to limit the vocabulary for speech recognition and enhance system performance.

The data processing means includes means for sending advertisement to the user in between or after the outputs.

The said input interface means and/or output generation means are speech enabled wireless application protocol devices.

The said output generation means supports a graphical display interface.

The said input interface is a microphone of a regular telephone device, land line or mobile and the output generation means is a speaker of said phone device, the speaker is meant only for single user and the microphone is meant for the user's surroundings.

The said output generation means is a speaker of a telephone device, which could be plugged in the user's ears using a wire or wireless medium namely, Bluetooth.

The said output generation means is a display panel on a watch strap connected to the phone device through a wire or wireless medium.

The said input interface means captures the speech from the users environment and provides a feedback to the user after improving understandability.

The said input interface means is a microphone of a regular telephone device, land line or mobile.

The said output generation means automatically tracks the conversational context using already known techniques and multimedia devices.

The input interface receives speech input from more than one source and provides improved understandability for all the received speech signals in accordance with the user profile.

The above system further comprises pricing mechanism which is based on the quality of service and on fixed amount per unit time of use or variable amount per time of use or down payment for certain period of use or combination of down payment and pay per use or combination of down payment and unit time of use including period for free use.

The present invention further provides a personalized method for providing a service for improving understandability of received speech in accordance with user specific needs characterized in that it includes:

capturing received speech signals, identifying the contents of said received speech through speech recognition or speech signal analysis, processing the data for performing improvement in understandability, providing user specific improvement data by a user profile storage, and generating personalized output based on an individual's needs.

The said method is executed online.

The speech recognition is by any known speech recognition methods.

The said processing of data is done by computation.

The said processing of data is done by a server in a client server environment.

The said processing of data is done by a self-leaning using artificial intelligence or expert method technique, which improves its performance based on feedback from the users over a period of time and also dynamically updates the user's current profiles.

The said speech recognition, speech signal analysis, data processing and output generation individually or collectively improve performance automatically with time, use, improvement in technology, enhancement in design or changes in user profile and provides the improved service without the need to make any changes to the user equipment.

The said generation of personalized output is by generating speech from the electrical signal received from said processing of data.

The said generation of personalized output is displayed for generating visual output for the user.

The said generation of personalized output is in a vibro-tactile form for generating output for the user in tactile form.

The above method further includes registering of the user with said method.

The said processing of data includes performing the understandability improvement with reference to the context of the received speech.

The said processing of data includes translation of the received speech from one language to another.

The said processing of data includes computing the data partially on the client and partially on the server.

The said processing of data includes specifying or modifying the stored individual profile for the user.

The user identifies himself by a userid at the beginning of each transaction.

The said processing of data includes a default profile in the absence of specific user profiles.

The method allows the user to specify a usage environment or conversation context at the beginning of each transaction.

The said processing of data includes use of a specified context to limit the vocabulary for speech recognition and enhance system performance.

The said processing of data includes sending advertisement to the user in between or after the outputs.

The said capturing of received speech signals and/or generation of personalized output is by use of speech enabled wireless application protocol methods.

The said generation of personalized output supports a graphical display interface.

The received speech signals are captured through a microphone of a regular telephone device, land line or mobile and the output is generated through a speaker of said phone device, the speaker is meant only for single user and the microphone is meant for the user's surroundings.

The said generation of personalized output is through a speaker of a telephone device, which could be plugged in the user's ears using a wire or wireless medium namely, Bluetooth.

The said generation of personalized output is through a display panel on a watch strap connected to the phone device through a wire or wireless medium.

The above method further includes capturing the speech from the user's environment and providing a feedback to the user after improving understandability.

The said generation of personalized output includes automatic tracking of the conversational context using already known techniques and multimedia devices.

The speech input is received from more than one source and improved understandability for all the received speech signals is provided in accordance with the user profile.

The above method further comprises pricing, which is based on the quality of service and on fixed amount per unit time of use or variable amount per time of use or down payment for certain period of use or combination of down payment and pay per use or combination of down payment and unit time of use including period for free use.

The instant invention further provides a personalized computer program product comprising computer readable program code stored on computer readable storage medium embodied therein for providing a service for improving understandability of received speech in accordance with user specific needs comprising:

- computer readable program code means configured for capturing received speech signals,
- computer readable program code means configured for identifying the contents of said received speech through speech recognition or speech signal analysis,
- computer readable program code means configured for processing the data for performing improvement in understandability,
- computer readable program code means configured for providing user specific improvement data by a user profile storage, and
- computer readable program code means configured for generating personalized output based on an individual's needs.

The said personalized computer program product is online.

The speech recognition is performed by computer readable program code devices using any known speech recognition techniques.

The said computer readable program code means configured for processing of data is a computing system.

The said computer readable program code means configured for processing of data is a server system in a client server environment.

The said computer readable program code means configured for processing of data is a self-learning system using artificial intelligence or expert method technique, which improves its performance based on feedback from the users over a period of time and also dynamically updates the user's current profiles.

The said computer readable program code means configured for speech recognition, speech signal analysis means, data processing and output generation individually or collectively improve performance automatically with time, use, improvement in technology, enhancement in design or changes in user profile and provides the improved service without the need to make any changes to the user equipment.

The said computer readable program code means for generating output is configured to generate personalized output for the user in display form.

The said computer readable program code means configured for generating output is configured for generating personalized output for the user in vibro-tactile form.

The above computer program product further includes computer readable program code means configured for the user to register with said computer program product.

The said computer readable program code means configured for processing of data performs the understandability improvement with reference to the context of the received speech.

The said computer readable program code means configured for processing of data translates the received speech from one language to another.

The said computer readable program code means configured for processing of data computes the data partially on the client and partially on the server.

The said computer readable program code means configured for processing of data specifies or modifies the stored individual profile for the user.

The user identifies himself by a userid at the beginning of each transaction.

The said computer readable program code means configured for processing of data includes a default profile in the absence of specific user profiles.

The computer program product allows the user to specify a usage environment or conversation context at the beginning of each transaction.

The said computer readable program code means configured for processing of data uses a specified context to limit the vocabulary for speech recognition and enhance system performance.

The said computer readable program code means configured for processing of data sends advertisement to the user in between or after the outputs.

The said computer readable program code means configured for capturing received speech signals and/or generation of personalized output is by use of speech enabled wireless application protocol methods.

The said computer readable program code means configured for generating personalized output supports a graphical display interface.

The said computer readable program code means configured for capturing received speech signals is a microphone of a regular telephone device, land line or mobile and the computer readable program code means configured for generating output is a speaker of said phone device, the speaker is meant only for single user and the microphone is meant for the user's surroundings.

The said computer readable program code means configured for generating personalized output is through a speaker of a telephone device, which could be plugged in the user's ears using a wire or wireless medium namely, Bluetooth.

The said computer readable program code means configured for generating personalized output is through a display panel on a watch strap connected to the phone device through a wire or wireless medium.

The said computer readable program code means configured for generating personalized output includes tracking conversational text automatically using already known techniques and multimedia devices.

The computer readable program code means configured for capturing received speech signals receives speech input from more than one source and provides improved understandability for all the received speech signals in accordance with the user profile.

The above computer program product further comprises computer readable program code means configured for pricing, which is based on the quality of service and on fixed amount per unit time of use or variable amount per time of use or down payment for certain period of use or combination of down payment and pay per use or combination of down payment and unit time of use including period for free use.

BRIEF DESCRIPTION OF THE DRAWINGS

The invention will now be described with reference to the accompanying drawings.

DETAILED DESCRIPTION OF THE DRAWINGS

Figure 1:
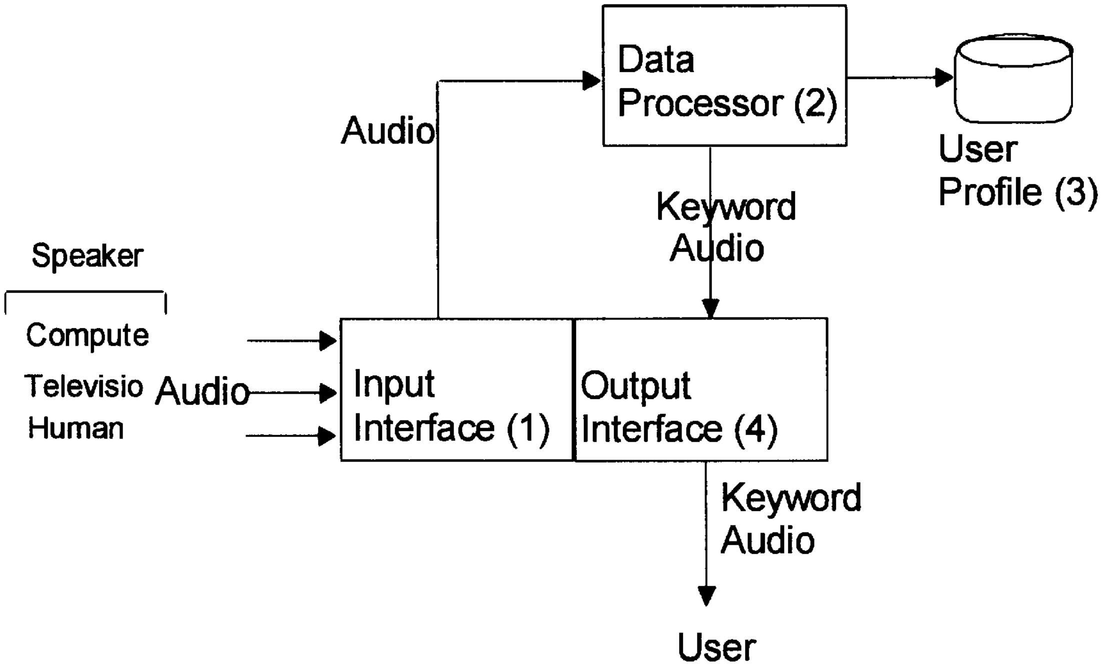
FIG. 1 shows a general block diagram of the present invention.

FIG. 1 shows an Input Interface (1) that has the ability to listen and capture audio signals from the user's surroundings. The captured audio signals include the voice of people around the user, background sound, audio from an equipment like television, software program, radio or any other sound from the user's environment. The input interface (1) sends the captured audio signals to a Data Processor (2), through wired or wireless medium. The said input interface (1) could break the continuous audio signal in smaller, finite duration pieces before sending to the Data processor (2) or send the continuous signal to the Data processor (2) depending on the transmission media and bandwidth availability.

The Data Processor (2) receives the audio signal from the input interface (1) and extracts words including keywords from the audio signal and/or modifies the audio signal. A general word including keyword extraction from audio input is done by using a plurality of speech recognition techniques in the data processor. A more user-specific extraction would use data from a user profile (3) stored in the system. The data processor (2) can do either a combination of speech recognition and audio modification or only speech recognition or only audio modification. The speech recognition and audio modification when done in combination can be done in parallel or sequentially. The modified signal is sent to an output interface (4). This output can be communicated separately or combined in a plurality of ways. The transmission to the output interface is similar to the way it is for the input interface (1) and can be done through wired or wireless medium or a combination of the two.

The User-profile (3) comprises of the user's acoustic processing abilities. Acoustic processing ability could be measured in terms of amount of emphasis, stretching and/or phase adjustment required to enable the user to achieve acceptable comprehension of spoken language. It addresses the individual's ability to process short duration acoustic events at rates that occur in normal speech, the ability to detect and identify sounds that occur simultaneously or in close proximity to each other i.e. backward and forward masking and the ability to hear frequency at specific amplitudes as captured in an audiogram.

The Output Interface (4) receives the words including keywords and/or modified audio from the data processor (2) and communicates these to the user through a plurality of interfaces (not shown) such as textual or graphical display, audio, vibro-tactile or a combination thereof.

Figure 2:
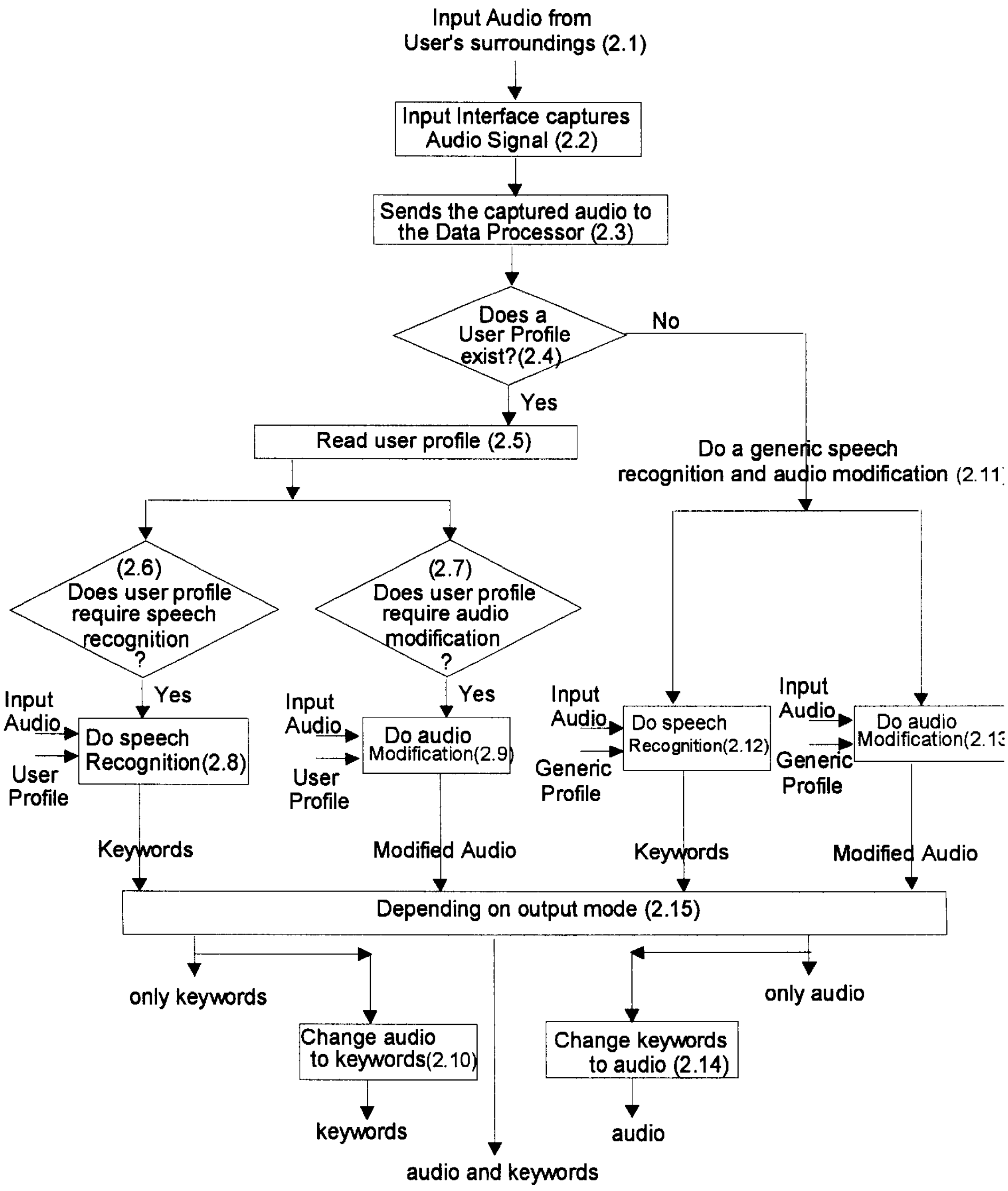
FIG. 2 shows a general flow chart of the data processor for speech recognition and audio modification.

In FIG. 2, a general flow chart of the data processor functioning has been shown. The input audio signals from the user's surroundings (2.1) are captured by input interface (2.2), which sends it to the data processor (2.3). The system checks if the user profile exists (2.4). If the user profile exists then it is read (2.5). The system then determined whether speech recognition (2.6) or audio modification (2.7) is required accordingly the system performs speech recognition (2.8) or audio modification (2.9) and sends the modified audio recognized words including keywords to the output depending upon the output mode (2.15) and changes the word including the keyword to audio (2.10).

If the user profile does not exist, the data processor does a generic speech recognition or audio modification (2.11) on the input audio and compare the input audio to the generic profile (2.12) or audio modification (2.13) and send the words including keywords or modified audio to the output depending upon the output mode (2.15) which changes the words, keywords to the audio (2.14).

Figure 3:
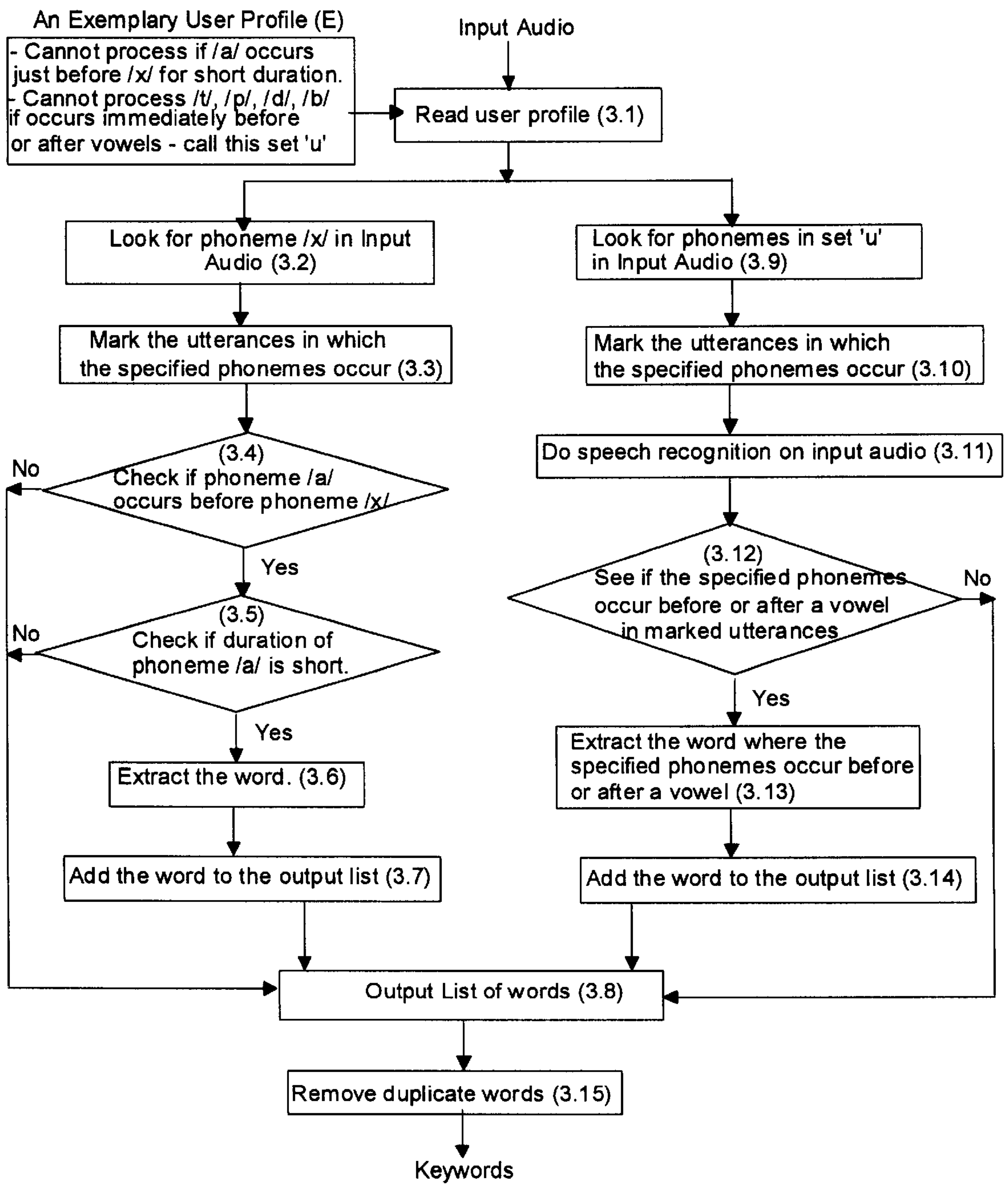
FIG. 3 shows the flow diagram of user specific word including keyword extraction.

FIG. 3 depicts an instance of user specific word including keyword extraction mechanism using a sample user profile.

The data processor receives the input audio signal and reads the user profile (3.1), as specified in the example (E) and looks for phoneme (x) in the input audio (3.2), it then marks the utterances in which the specified phoneme occur (3.3) and checks if the phoneme (a) occurs before the phoneme (x) (3.4). it then checks if the duration of phoneme (a) is short (3.5). If it is short, then a word is extracted (3.6) and added to the output list (3.7 & 3.8), after removing the duplicate words (3.15). If the phoneme (a) does not occur before phoneme (x), then it adds the phoneme to the output list of words (3.8) and removes the duplicate words (3.15) to get the words including keywords.

If the user profile is a set 'u' in input audio (3.9), the system marks the utterances in which the specified phoneme occur (3.10) and does a speech recognition on input audio (3.11) and checks if the specified phoneme occurs before or after a vowel in marked utterances (3.12). If true, it extracts the word from where the specified phoneme occurs before and after the vowel (3.13) and adds the word to the output list (3.14) after removing duplicate words (3.15) and gets words including keywords.

If the specified phoneme does not occur before or after a vowel in the utterances, then it adds the speech recognized audio input to the output list of words (3.8 & 3.14) and removes duplicate words (3.15).

Figure 4:
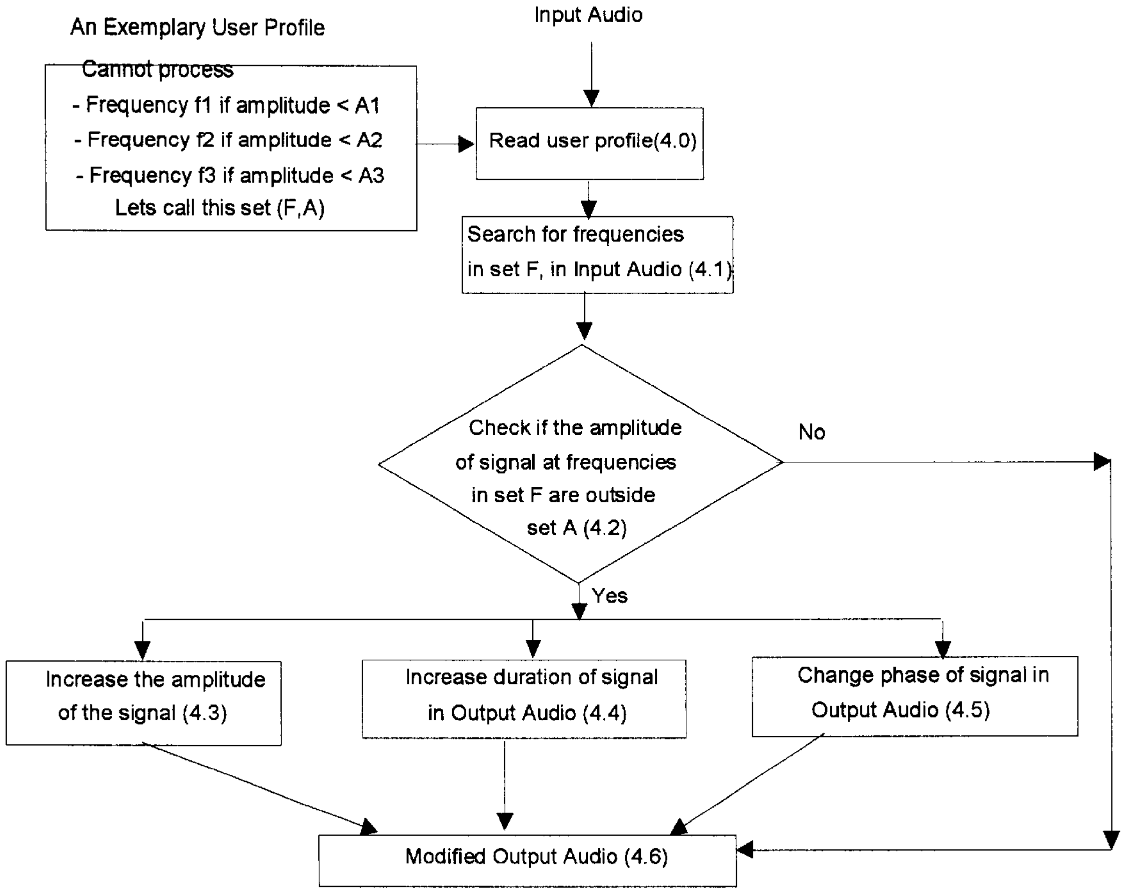
FIG. 4 shows the user specific audio modification flow diagram.

FIG. 4 depicts an instance of a user specific audio modification mechanism using a sample user profile.

The data processor receives the input audio signal and reads the user profile (4.0). In the sample user profile, the user has the disability of not being able to process different frequencies below certain amplitude levels. The data processor looks for frequency F in input audio (4.1), to check if the amplitude of signal at frequency in set F are outside set A (4.2). If above condition is true, then it increases the amplitude (4.3), duration (4.4) and changes phase of signal in output audio (4.5) and sends the modified output audio (4.6) to the output interface.

If the amplitude of the signal at frequencies in set F is not outside set A, then it adds the input audio (4.1) to the modified output audio (4.6).

Figure 5:
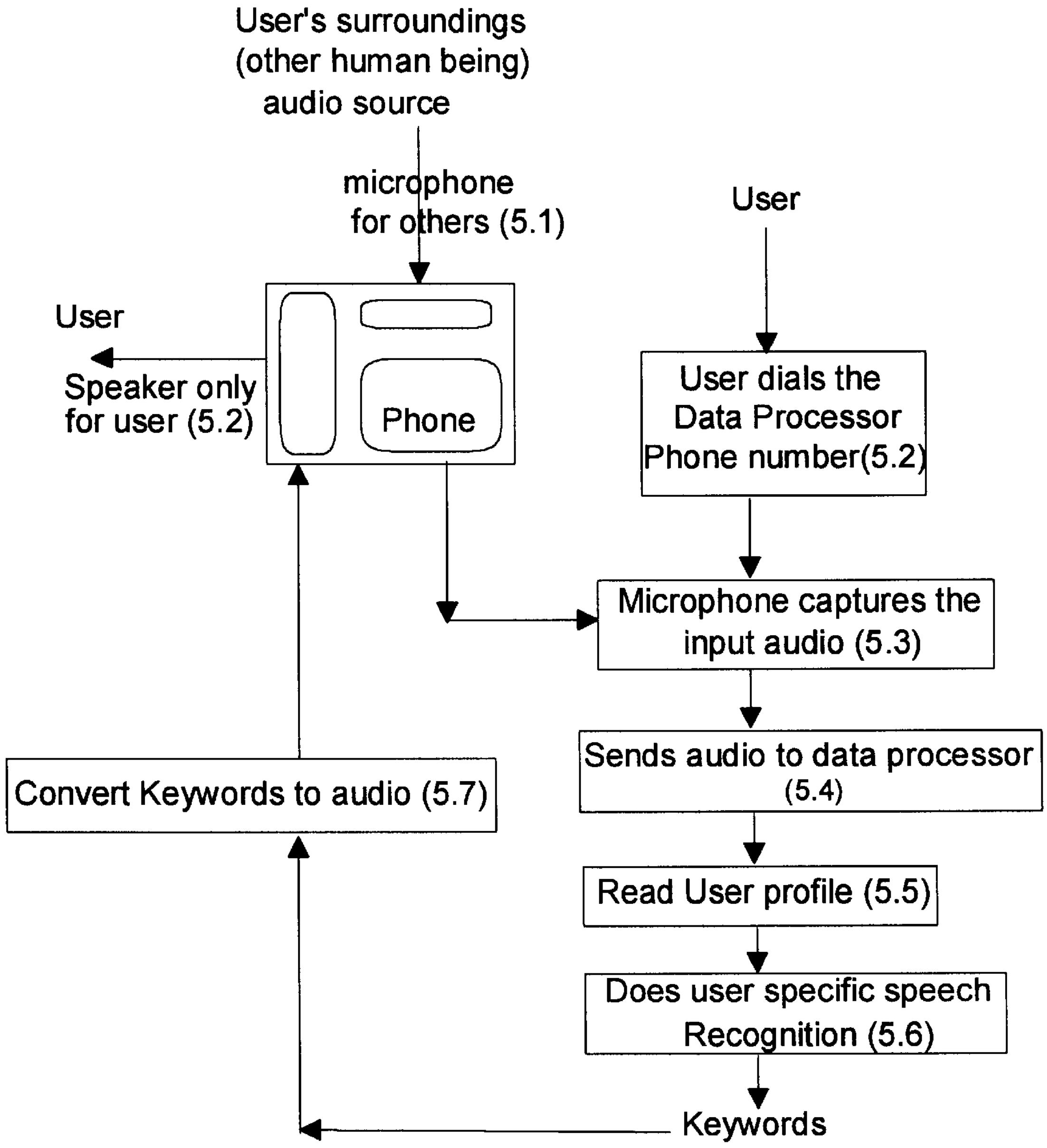
FIG. 5 shows a flow diagram of the use of a normal phone with this invention.

FIG. 5 shows the unique use of a regular phone in this invention. Here input is from the microphone (5.1) of a regular telephone device, land line or mobile, and the output is through the speaker of the phone device (5.2). The user of the phone device is in a conversation with another human being and has difficulty in hearing or understanding normal speech. The user uses the phone and dials into a data processor (5.2).

The microphone of the user's phone captures the audio of the other human being (5.3) and sends to the data processor (5.4). The data processor reads the user profile (5.5), does user specific speech recognition (5.6) of the received audio and sends the relevant words, including keywords, back to the phone device, which converts the words/keywords to audio (5.7). The user listens to these words including keywords using the phone's speaker. These words including keywords are meant to be heard only by the user and not his/her surroundings. With the help of these words including keywords, the user can better comprehend the conversation.

This is a very unconventional use of a phone device in the following ways.

Typically a phone is used is to talk to someone located distantly. Here the phone device is being used to understand/hear someone located nearby, near enough to be normally heard without the use of a phone.

Secondly, the speaker and microphone of a phone are typically used by the same person(s). In a conventional phone, a single person uses the speaker and the microphone of the phone. In the speaker mode of the conventional phone, a plurality of persons use the speaker and the microphone of the phone. There is also a device where the microphone is used by an individual and the speaker is meant for everyone in the surrounding. But the proposed invention suggests a unique use of the phone device where the speaker is meant only for the single user and the microphone is meant for the user's surroundings.

The information being received on the speaker is of relevance only to the user and not his/her surroundings. The received information is the word including keyword, extracted from the audio captured from the user's surroundings.

Figure 6:
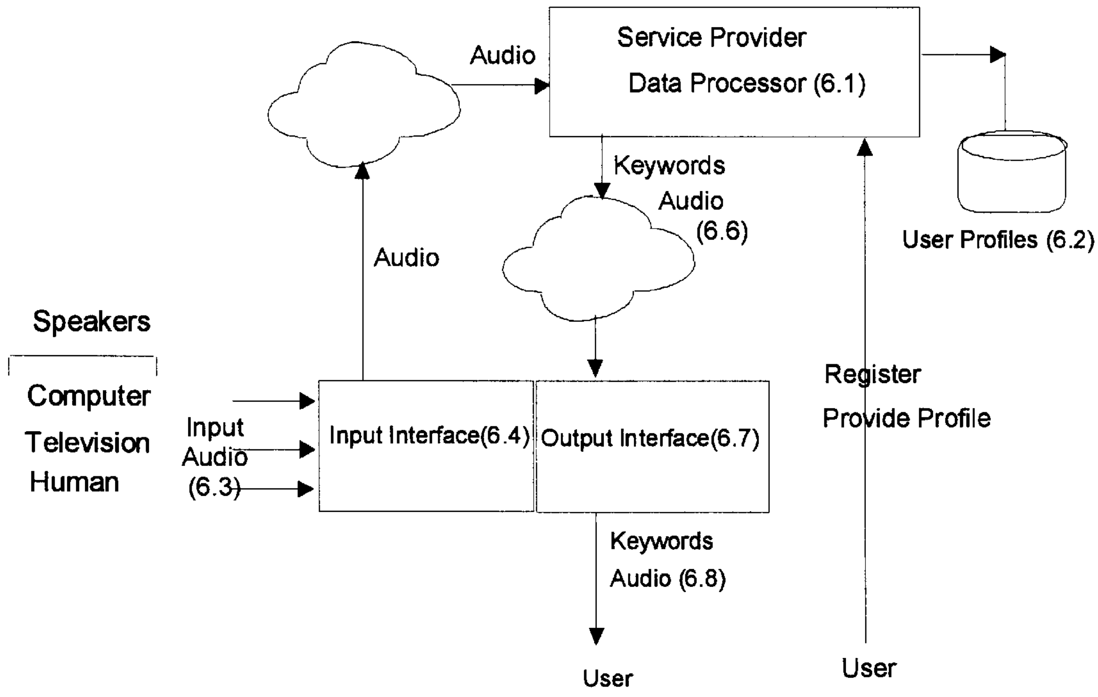
FIG. 6 shows a model of a system providing a service according to this invention.

FIG. 6 depicts an embodiment of this invention in which the data processing functionality could be provided as a third party service to a plurality of users, over a network, such as an Intranet, an Extranet or an Internet. The user registers with the service provider data processor (6.1) and provides his/her acoustic capability profile (6.2). The user gets a unique userid after registration with the server. To avail of the service, the user dials a particular number, told by the service provider. The receiving end of the dialed number is the service provider data processing server (6.1). The phone device, input interface (6.4) captures the input audio (6.3) from the user's surroundings and sends to the data processing server as received audio (6.5). The data processing server (6.1) needs to identify the user to provide user specific acoustic processing on received audio. This could be done on the basis of the originating phone number or could be done by specifying the userid at the beginning of the transaction. The server maintains a mapping of the userid or phone number and the corresponding user profile. It obtains the user profile (6.2) for the relevant user, performs a user specific speech recognition and/or audio modification of the received audio and sends the relevant words including keywords or the modified audio or a combination thereof (6.6) to the output interface (6.7) of the phone device which generates the audio output (6.8).

In another embodiment of this invention, the words including keywords could be displayed in text or as graphics on a display panel on the phone device instead of being an audio heard through the phone speaker.

In another embodiment of this invention, the speaker could be plugged in the user's ears and communicate with the phone device using a wired medium or a wireless protocol such as Bluetooth.

In another embodiment of the present invention, the display panel could be in form of a strap or watch worn on the user's arms and the words including keywords keep scrolling down on the strap. The strap communicates to the phone device again using a wired medium or a wireless protocol such as Bluetooth.

In another embodiment of this invention, the speech recognition, the audio modification and features captured in an acoustic profile change/improve with time and technological advancement and new profile characteristics, improved recognition engine or other techniques are incorporated in the data processor. The changes and improvements are made available to all the users of the service without having to upgrade each user's device.

In another embodiment of this invention, the user can specify or modify his/her acoustic profile stored at the service provider.

In another embodiment of this invention, the service provider can use a default profile in absence of a user-specific profile.

In another embodiment of this invention, the service provider system learns over a period of time, across multiple user transactions, and dynamically updates the user's current profile.

In another embodiment of this invention the input interface captures the speech from the users environment and provides a feedback to the user afte improving understandability.

In another embodiment of this invention, the user specifies a usage environment or conversation context, from a predetermined set of options, at the beginning of each transaction. The user can specify the context along with the user id at the beginning of the transaction. The service provider system then makes use of the specified context to limit the vocabulary for speech recognition and audio modification and enhance system performance.

In another embodiment of this invention, conversational context can be tracked automatically using already known methods and multimedia devices.

In another embodiment of this invention, the service provider can learn from the experiences and feedback from a plurality of users to improve its profile characteristics and data processing techniques. The changes and improvements are made available to all the users of the service without having to upgrade each user's device.

In another embodiment of this invention, the service provider can also provide mechanisms to determine the user's acoustic profile.

In another embodiment of this invention, the device used is a speech-enabled WAP (Wireless Application Protocol, refer to www.wapforum.org) device. Such speech enabled WAP devices already available from companies like Phone.com. The user specifies a URL or dials a number and the captured audio is sent to the data processing server through a WAP gateway. The extracted words including keywords from the data processor are sent back to the WAP device, similar to the response sent in web browsing or e-mail, using WAP protocol.

In another embodiment of this invention, the device could be handheld pervasive device or worn in form of a smart watch or a wearable audio computer.

In another embodiment of this invention, all the components i.e. the Input Interface, the Data Processor and the Output Interface, are packaged in a single device. The Input Interface captures the audio signal and sends to the Data Processor. The Data Processor is a specialized hardware or a software program running on a generic or specialized hardware. It could be a software program written in embedded java. It extracts words including keywords from the captured audio using speech recognition techniques and sends the words including keywords to the Output Interface. The Output Interface displays the words including keywords on a display panel in the device in textual or graphical form. In this solution, no run-time cost is incurred for accessing the service. The cost is one-time for the purchase of the device.

In another embodiment of this invention, it is possible to have an intermediate solution between the two extremes described above, namely a single device solution and a client-server solution. In an intermediate solution, part of the data processing is done on the client and part of the processing is done on the server. People skilled in distributed, networked systems can optimally distribute the processing across various modules keeping in mind the bandwidth, network delay and storage space and computing power constraints.

In another embodiment of this invention, the Output Interface supports a vibro-tactile interface.

A Vibro-tactile interface communicates the words including keywords by allowing the user to feel the unique pattern of vibrations present in every sound. The user gains sound information by feeling the rhythm, duration, intensity, and pattern of the vibrations. A vibro-tactile module can be attached to the output interface such as a regular phone, a mobile phone, WAP devices or other pervasive devices to convert each word including keyword to a sound which is conveyed to the user by means of vibrations on the user's skin. Some examples of vibro-tactile devices are MiniVib4: Tactile aid from Special Instruments Development, Tactaid II and VII, Tactile aids from Audiological Engineering Corporation and TAM, Tactile aid from Summit, Birmingham, UK.

In another embodiment of this invention, the Output interface supports a graphical display interface. The output words including keywords are conveyed to the user by means of images or pictures on the graphical display. This could use a specific sign language to display the word including keyword or a commonly understood pictorial depiction of the keyword. For the output as a modified audio, the audio is first converted to specific words including keywords and then communicated as other words including keywords. This is helpful when the person is not well conversant with the display language e.g. a person in a foreign land or a person with cognitive disability.

In another embodiment of this invention, there could be a plurality of speakers e.g. in a social gathering or in a meeting. In presence of a plurality of speakers, speaker differentiation is important especially if there is significant delay between the input audio and the output words including keywords. Speaker differentiation is done using directional microphone. Examples of some directional microphones are Earthworks' TC30K, MVM Acoustics's V-2 etc. The speaker identity is sent along with the audio to the data processor. Devices as specified in 'AudioStreamer: Exploiting Simultaneity for Listening', ACM, CHI'95 proceedings, can also be used for speaker differentiation. The output words including keywords are associated with the input speaker identity. The speaker's identity can be conveyed to the user by a textual or visual display on the display panel.

In another embodiment of this invention, the user profile also contains the user's preferred language. The Data Processor contains a translator that can translate the words including keywords from one language to another. So the audio is captured in one language, words including keywords extracted in the same language can now be translated to another language that the user is more conversant with. In terms of Output Interface, for textual display and vibro-tactile interface, the device needs to support the output language. For graphical interface, no additional support is required since graphics is language independent.

In another embodiment of this invention, a plurality of business models can be used by the service provider to make the service practical and affordable for the common masses. The business model for this online personalized service cannot be the same as that a car rental service. The reason being that though a car rental service also provides better, new cars and a more personalized service than each individual possessing his/her own car, a car rental service is not required for everyday living. A service addressing the disability to process or understand audio is a utility service like electricity or water and needs to be priced very thoughtfully.

In one embodiment of the business model, the user incurs the phone charges for the entire duration that it is being used. The service provider may or may not charge any additional amount.

In another embodiment of the business model, the service provider incurs the phone charges. The service provider may or may not charge any additional amount.

In another embodiment of this invention, the pricing could be worked out on the basis of the cost of a hearing aid or similar devices and its typical life cycle period. E.g. if a decent digital hearing aid costs around \$1000–\$2000 and its life cycle typically is 3–5 years. After 3–5 years, new technology becomes available at similar price. A sum of $1000–$2000 for approximately 1500 days implies a price of 1$ per day for 3–5 years usage. Add to this the interest that the person would have obtained on the initial sum over 5 years, say about $2 a day. The user is paying $3 a day currently and does not get continuous technological advancements or better personalization features. Even if the cost for phone charges or network usage during transaction was to be incorporated say $8 for about 3 hours during a day. The user has to pay an additional of $5 per day and can avail a continuously improving, better personalized and dynamically adaptive service. With voice data over Internet coming in near future, the phone/network charges will reduce significantly, making the service even more affordable.

In another embodiment of this invention, the pricing mechanism could also be based on quality of service such as the level of personalization e.g. speech recognition alone, audio modification alone, both speech recognition and audio modification, multi-speaker audio manipulation, noisy input audio signal, the level of personalization, the use of context, features of user profile such as the number of phonemes that the user has problems recognizing etc.

In another embodiment of this invention, the service provider can use a combination of any of the well known pricing mechanisms. The pricing mechanism could be a fixed amount paid per minute of service use or a variable amount paid per minute of service use. It could be an initial downpayment for a certain number of hours usage during a specified maximum duration. E.g. an initial downpayment of $1000 for 1000 hours, used in a maximum of 3 years. A combination of the downpayment and pay per use can also be deployed. E.g. an initial downpayment of $300, first 100 hours free and then certain charge for next 100 hours. The service provider can also offer a free or nearly free initial offering to introduce the service in the market.

In another embodiment of the business model, the service provider sends advertisements to the user in between or after the output words including keywords /audio to share the incurred costs with advertisers.

We claim:

1. A personalized system for providing a service for improving understandability of received speech in accordance with user specific needs characterized in that it includes:

input interface means for capturing received speech signals connected to a speech recognition or speech signal analysis means for identifying the contents of the received speech connected to one input of a data processing means for performing improvement in understandability, a user profile storage means connected to another input of said data processing means for providing user specific improvement data, and an output generation means connected to the output of said data processing means to produce personalized output based on an individual's needs.

2. The system as claimed in claim 1, wherein said personalized system is online.

3. The system as claimed in claim 1, wherein said speech recognition means is any known speech recognition means.

4. The system as claimed in claim 1, wherein said data processing means is a computing system.

5. The system as claimed in claim 1, wherein said data processing means is a server system in a client server environment.

6. The system as claimed in claim 1, wherein said data processing means is a self-learning system using artificial intelligence or expert system techniques, which improves its performance based on feedback from the users over a period of time and also dynamically updates the users current profiles.

7. The system as claimed in claim 1 wherein said speech recognition means, speech signal analysis means, data processing means and output generation means individually or collectively improve performance automatically with time, use, improvement in technology, enhancement in design or changes in user profile and provides the improved service without the need to make any changes to the user equipment.

8. The system as claimed in claim 1, wherein said output generation means is a means for generating speech from the electrical signal received from said data processing means.

9. The system as claimed in claim 1, wherein said output generation means is a display means for generating visual output for the user.

10. The system as claimed in claim 1, wherein said output generation means is a vibro-tactile device for generating output for the user in tactile form.

11. The system as claimed in claim 1 further includes means for the user to register with said system.

12. The system as claimed in claim 1, wherein said data processing means includes means to perform the understandability improvement with reference to the context of the received speech.

13. The system as claimed in claim 1, wherein said data processing means includes means to translate the received speech from one language to another.

14. The system as claimed in claim 1, wherein said data processing means includes means for computing the data partially on the client and partially on the server.

15. The system as claimed in claim 1, wherein said data processing means includes the means for the user to specify or modify the stored individual profile.

16. The system as claimed in claim 1, wherein the user identifies himself by a userid at the beginning of each transaction.

17. The system as claimed in claim 1, wherein said data processing means includes a default profile means in the absence of specific user profiles.

18. The system as claimed in claim 1 wherein the system allows the user to specify a usage environment or conversation context at the beginning of each transaction.

19. The system as claimed in claim 1, wherein data processing means includes use of a specified context to limit the vocabulary for speech recognition and enhance system performance.

20. The system as claimed in claim 1, wherein the data processing means includes means for sending advertisement to the user in between or after the outputs.

21. The system as claimed in claim 1, wherein said input interface means and/or output generation means are speech enabled wireless application protocol devices.

22. The system as claimed in claim 1, wherein said output generation means supports a graphical display interface.

23. A system as claimed in claim 1 wherein said input interface is a microphone of a regular telephone device, land line or mobile and the output generation means is a speaker of said phone device, the speaker is meant only for single user and the microphone is meant for the user's surroundings.

24. The system as claimed in claim 1, wherein said output generation means is a speaker of a telephone device, which could be plugged in the user's ears using a wire or wireless medium namely, Bluetooth.

25. The system as claimed in claim 1, wherein said output generation means is a display panel on a watch strap connected to the phone device through a wire or wireless medium.

26. The system as claimed in claim 1 wherein said input interface means captures the speech from the users environment and provides a feedback to the user after improving understandability.

27. The system as claimed in claim 1, wherein said output generation means automatically tracks the conversational context using already known techniques and multimedia devices.

28. The system as claimed in claim 1, wherein the input interface receives speech input from more than one source and provides improved understandability for all the received speech signals in accordance with the user profile.

29. The system as claimed in claim 1 further comprising pricing mechanism which is based on the quality of service and on fixed amount per unit time of use or variable amount per time of use or down payment for certain period of use or combination of down payment and pay per use or combination of down payment and unit time of use including period for free use.

30. A personalized method for providing a service for improving understandability of received speech in accordance with user specific needs characterized in that it includes:

capturing received speech signals using an input interface, identifying the contents of said received speech using a speech recognition device or speech signal analysis device, processing the data for performing improvement in understandability, providing user specific improvement data by a user profile storage, and generating personalized output based on an individual's needs using an output generator.

31. The method as claimed in claim 30, wherein said method is executed online.

32. The method as claimed in claim 30, wherein speech recognition is by any known speech recognition methods.

33. The method as claimed in claim 30, wherein said processing of data is done by computation.

34. The method as claimed in claim 30, wherein said processing of data is done by a server in a client server environment.

35. The method as claimed in claim 30, wherein said processing of data is done by a self-learning using artificial intelligence or expert method technique, which improves its performance based on feedback from the users over a period of time and also dynamically updates the user's current profiles.

36. The method as claimed in claim 30, wherein said speech recognition, speech signal analysis, data processing and output generation individually or collectively improve performance automatically with time, use, improvement in technology, enhancement in design or changes in user profile and provides the improved service without the need to make any changes to the user equipment.

37. The method as claimed in claim 30, wherein said generation of personalized output is by generating speech from the electrical signal received from said processing of data.

38. The method as claimed in claim 30, wherein said generation of personalized output is displayed for generating visual output for the user.

39. The method as claimed in claim 30, wherein said generation of personalized output is in a vibro-tactile form for generating output for the user in tactile form.

40. The method as claimed in claim 30 further includes registering of the user with said method.

41. The method as claimed in claim 30, wherein said processing of data includes performing the understandability improvement with reference to the context of the received speech.

42. The method as claimed in claim 30, wherein said processing of data includes translation of the received speech from one language to another.

43. The method as claimed in claim 30, wherein said processing of data includes computing the data partially on the client and partially on the server.

44. The method as claimed in claim 30, wherein said processing of data includes specifying or modifying the stored individual profile for the user.

45. The method as claimed in claim 30, wherein the user identifies himself by a userid at the beginning of each transaction.

46. The method as claimed in claim 30, wherein said processing of data includes a default profile in the absence of specific user profiles.

47. The method as claimed in claim 30, wherein the method allows the user to specify a usage environment or conversation context at the beginning of each transaction.

48. The method as claimed in claim 30, wherein said processing of data includes use of a specified context to limit the vocabulary for speech recognition and enhance system performance.

49. The method as claimed in claim 30, wherein said processing of data includes sending advertisement to the user in between or after the outputs.

50. The method as claimed in claim 30, wherein said capturing of received speech signals and/or generation of personalized output is by use of speech enabled wireless application protocol methods.

51. The method as claimed in claim 30, wherein said generation of personalized output supports a graphical display interface.

52. The method as claimed in claim 30 includes capturing the speech from the user's environment and providing a feedback to the user after improving understandability.

53. The method as claimed in claim 30, wherein said generation of personalized output includes automatic tracking of the conversational context using already known techniques and multimedia devices.

54. The method as claimed in claim 30, wherein the speech input is received from more than one source and improved understandability for all the received speech signals is provided in accordance with the user profile.

55. The method as claimed in claim 30 further comprising pricing, which is based on the quality of service and on fixed amount per unit time of use or variable amount per time of use or down payment for certain period of use or combination of down payment and pay per use or combination of down payment and unit time of use including period for free use.

56. A personalized method for providing a service for improving understandability of received speech in accordance with user specific needs characterized in that it includes:

capturing received speech signals, identifying the contents of said received speech through speech recognition or speech signal analysis, processing the data for performing improvement in understandability, providing user specific improvement data by a user profile storage, and generating personalized output based on an individual's needs, wherein received speech signals are captured through a microphone of a regular telephone device, land line or mobile and the output is generated through a speaker of said telephone device, the speaker is meant only for single user and the is meant for the user's surroundings.

57. A personalized method for providing a service for improving understandability of received speech in accordance with user specific needs characterized in that it includes:

capturing received speech signals, identifying the contents of said received speech through speech recognition or speech signal analysis, processing the data for performing improvement in understandability, providing user specific improvement data by a user profile storage, and generating personalized output based on an individual's needs, wherein said generation of personalized output is through a speaker of a telephone device, which could be plugged in the user's ears using a wire or wireless medium namely, Bluetooth.

58. A personalized method for providing a service for improving understandability of received speech in accordance with user specific needs characterized in that it includes:

capturing received speech signals, identifying the contents of said received speech through speech recognition or speech signal analysis, processing the data for performing improvement in understandability, providing user specific improvement data by a user profile storage, and generating personalized output based on an individual's needs, wherein said generation of personalized output is through a display panel on a watch strap connected to a telephone device through a wire or wireless medium.

59. A personalized computer program product comprising computer readable program code stored on computer readable storage medium embodied therein for providing a service for improving understandability of received speech in accordance with user specific needs comprising:

computer readable program code means configured for capturing received speech signals, computer readable program code means configured for identifying the contents of said received speech through speech recognition or speech signal analysis, computer readable program code means configured for processing the data for performing improvement in understandability, computer readable program code means configured for providing user specific improvement data by a user profile storage, and computer readable program code means configured for generating personalized output based on an individual's needs.

60. The computer program product as claimed in claim 59, wherein said personalized computer program product is online.

61. The computer program product as claimed in claim 59, wherein speech recognition is performed by computer readable program code devices using any known speech recognition techniques.

62. The computer program product as claimed in claim 59, wherein said computer readable program code means configured for processing of data is a computing system.

63. The computer program product as claimed in claim 59, wherein said computer readable program code means configured for processing of data is a server system in a client server environment.

64. The computer program product as claimed in claim 59, wherein said computer readable program code means configured for processing of data is a self-learning system using artificial intelligence or expert method technique, which improves its performance based on feedback from the users over a period of time and also dynamically updates the user's current profiles.

65. The computer program product as claimed in claim 59, wherein said computer readable program code means configured for speech recognition, speech signal analysis means, data processing and output generation individually or collectively improve performance automatically with time, use, improvement in technology, enhancement in design or changes in user profile and provides the improved service without the need to make any changes to the user equipment.

66. The computer program product as claimed in claim 59, wherein said computer readable program code means for generating output is configured to generate personalized output for the user in display form.

67. The computer program product as claimed in claim 59, wherein said computer readable program code means configured for generating output is configured for generating personalized output for the user in vibro-tactile form.

68. The computer program product as claimed in claim 59 further includes computer readable program code means configured for the user to register with said computer program product.

69. The computer program product as claimed in claim 59, wherein said computer readable program code means configured for processing of data performs the understandability improvement with reference to the context of the received speech.

70. The computer program product as claimed in claim 59, wherein said computer readable program code means configured for processing of data translates the received speech from one language to another.

71. The computer program product as claimed in claim 59, wherein said computer readable program code means configured for processing of data computes the data partially on the client and partially on the server.

72. The computer program product as claimed in claim 59, wherein said computer readable program code means configured for processing of data specifies or modifies the stored individual profile for the user.

73. The computer program product as claimed in claim 59, wherein the user identifies himself by a userid at the beginning of each transaction.

74. The computer program product as claimed in claim 59, wherein said computer readable program code means configured for processing of data includes a default profile in the absence of specific user profiles.

75. The computer program product as claimed in claim 59, wherein the computer program product allows the user to specify a usage environment or conversation context at the beginning of each transaction.

76. The computer program product as claimed in claim 59, wherein said computer readable program code means configured for processing of data uses a specified context to limit the vocabulary for speech recognition and enhance system performance.

77. The computer program product as claimed in claim 59, wherein said computer readable program code means configured for processing of data sends advertisement to the user in between or after the outputs.

78. The computer program product as claimed in claim 59, wherein said computer readable program code means configured for capturing received speech signals and/or generation of personalized output is by use of speech enabled wireless application protocol methods.

79. The computer program product as claimed in claim 59, wherein said computer readable program code means configured for generating personalized output supports a graphical display interface.

80. The computer program product as claimed in claim 59 wherein said computer readable program code means configured for capturing received speech signals is a microphone of a regular telephone device, land line or mobile and the computer readable program code means configured for generating output is a speaker of said phone device, the speaker is meant only for single user and the microphone is meant for the user's surroundings.

81. The computer program product as claimed in claim 59, wherein said computer readable program code means configured for generating personalized output is through a speaker of a telephone device, which could be plugged in the user's ears using a wire or wireless medium namely, Bluetooth.

82. The computer program product as claimed in claim 59, wherein said computer readable program code means configured for generating personalized output is through a display panel on a watch strap connected to the phone device through a wire or wireless medium.

83. The computer program product as claimed in claim 59, wherein said computer readable program code means configured for generating personalized output includes tracking conversational context automatically using already known techniques and multimedia devices.

84. The computer program product as claimed in claim 59, wherein the computer readable program code means configured for capturing received speech signals receives speech input from more than one source and provides improved understandability for all the received speech signals in accordance with the user profile.

85. The computer program product as claimed in claim 59 further comprising computer readable program code means configured for pricing, which is based on the quality of service and on fixed amount per unit time of use or variable amount per time of use or down payment for certain period of use or combination of down payment and pay per use or combination of down payment and unit time of use including period for free use.

* * * * *